US012570109B2

(12) United States Patent
Durand-Gasselin et al.

(10) Patent No.: US 12,570,109 B2
(45) Date of Patent: Mar. 10, 2026

(54) TIRE WITH IMPROVED END-OF-LIFE GRIP ON WET GROUND

(71) Applicant: COMPAGNIE GENERALE DES ETABLISSEMENTS MICHELIN, Clermont-Ferrand (FR)

(72) Inventors: Benoit Durand-Gasselin, Clermont-Ferrand (FR); Marie-Laure Francois, Clermont-Ferrand (FR); Fabien Hellot, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 78 days.

(21) Appl. No.: 17/924,600

(22) PCT Filed: Apr. 22, 2021

(86) PCT No.: PCT/FR2021/050698
§ 371 (c)(1),
(2) Date: Nov. 10, 2022

(87) PCT Pub. No.: WO2021/229160
PCT Pub. Date: Nov. 18, 2021

(65) Prior Publication Data
US 2023/0191851 A1 Jun. 22, 2023

(30) Foreign Application Priority Data
May 13, 2020 (FR) ........................................ 2004711

(51) Int. Cl.
*B60C 11/00* (2006.01)
*B60C 11/03* (2006.01)
*B60C 11/24* (2006.01)

(52) U.S. Cl.
CPC ............ *B60C 11/24* (2013.01); *B60C 11/005* (2013.01); *B60C 11/033* (2013.01); *B60C 2011/0025* (2013.01)

(58) Field of Classification Search
CPC ..... B60C 11/24; B60C 11/005; B60C 11/033; B60C 2011/0033; B60C 2011/0025
See application file for complete search history.

(56) References Cited

U.S. PATENT DOCUMENTS 5,368,081 A 11/1994 Imamiya et al.
5,370,167 A * 12/1994 Kogure .................... B60C 9/18
152/537
(Continued)

FOREIGN PATENT DOCUMENTS

CA 2084954 A1 * 6/1993
EP 0558037 A1 9/1993
(Continued)

OTHER PUBLICATIONS

Machine translation for Japan 2006-088585 (Year: 2024).*
(Continued)

*Primary Examiner* — Steven D Maki
(74) *Attorney, Agent, or Firm* — VENABLE LLP

(57) ABSTRACT

A tire (10) for a passenger vehicle comprises a tread comprising at least one regulation wear indicator (46) defining a regulation wear threshold, a tread layer (52) comprising an elastomeric tread material exhibiting a complex dynamic shear modulus G*_1 and a dynamic loss tanD0_1, and a backing layer (54) for the tread layer (52) that comprises an elastomeric backing material exhibiting a complex dynamic shear modulus G*_2 and a dynamic loss tanD0_2 such that tanD0_2≥0.37×tanD0_1 and G*2≥0.90×G*1.

15 Claims, 4 Drawing Sheets

(56)                References Cited

U.S. PATENT DOCUMENTS

| | | | |
|---|---|---|---|
| 5,397,616 A * | 3/1995 | Aoki | B29D 30/52 |
| | | | 428/33 |
| 5,580,404 A * | 12/1996 | Hitzky | B60C 11/0309 |
| | | | 152/902 |
| 9,387,724 B2 | 7/2016 | Hirayama | |
| 9,987,884 B2 | 6/2018 | Guerinon et al. | |
| 11,124,634 B2 | 9/2021 | Francois et al. | |
| 11,731,460 B2 | 8/2023 | Trowbridge et al. | |
| 2001/0004911 A1* | 6/2001 | Iwamura | B60C 11/00 |
| | | | 152/211 |
| 2005/0161138 A1* | 7/2005 | Yukawa | B60C 11/033 |
| | | | 152/381.6 |
| 2006/0231181 A1 | 10/2006 | Roder et al. | |
| 2009/0255613 A1 | 10/2009 | Zhang et al. | |
| 2010/0116388 A1 | 5/2010 | Roder et al. | |
| 2010/0243116 A1* | 9/2010 | Yasunaga | B60C 11/24 |
| | | | 425/35 |
| 2014/0373989 A1 | 12/2014 | Hirayama | |
| 2015/0328931 A1 | 11/2015 | Guerinon et al. | |
| 2020/0123351 A1 | 4/2020 | Francois et al. | |
| 2020/0262244 A1 | 8/2020 | Trowbridge et al. | |

FOREIGN PATENT DOCUMENTS

| | | | |
|---|---|---|---|
| EP | 2108527 A1 | | 10/2009 |
| EP | 2815893 A2 | | 12/2014 |
| JP | 57-051504 A | * | 3/1982 |
| JP | 63-240405 A | * | 10/1988 |
| JP | 08-104107 A | * | 4/1996 |
| JP | 2006-088585 A | * | 4/2006 |
| WO | 2014/090845 A1 | | 6/2014 |
| WO | 2018/115722 A1 | | 6/2018 |
| WO | 2019/066839 A1 | | 4/2019 |

OTHER PUBLICATIONS

Machine translation for Japan 08-104107 (Year: 2024).*
Machine translation for Japan 63-240405 (Year: 2024).*
Machine translation for Japan 57-051504 (Year: 2024).*
International Search Report dated Jul. 19, 2021, in corresponding PCT/FR2021/050698 (5 pages).

* cited by examiner

TIRE WITH IMPROVED END-OF-LIFE GRIP ON WET GROUND

BACKGROUND

The present invention relates to a tyre for a passenger vehicle.

A tyre, sold under the trade name MICHELIN Primacy 4, of substantially toric shape about an axis of revolution substantially coincident with the axis of rotation of the tyre is known from the prior art. The tyre comprises a crown, two sidewalls and two beads, each sidewall connecting each bead to the crown. The tyre also comprises a carcass reinforcement that is anchored in each bead and extends in each sidewall and radially on the inside of the crown. The crown comprises a tread and a crown reinforcement, the crown reinforcement being arranged radially on the inside of the tread.

The tread comprises cuts separating the tread pattern blocks from one another. The cuts in particular comprise grooves and sipes. The grooves comprise circumferential grooves, at the bottom of which the wear indicators are arranged. Such wear indicators are imposed for example by United Nations Regulations R30 and R54, US Standard FMVSS139 or Chinese Standard GB97743 and seek to identify to the user of the tyre a regulation tyre wear threshold beyond which it is dangerous to run, particularly on wet ground. These wear indicators are thus referred to as regulation wear indicators. Each regulation wear indicator is formed by a protuberance extending radially from the bottom of the circumferential groove, in particular from the bottom of the deepest circumferential groove, radially outwards over a radial height substantially equal to 1.6 mm. This radial height makes it possible to define the wear potential of the tyre, in this instance 5.4 mm, as the radial height between, when the tyre is new, the radially outermost point of the regulation wear indicator and its projection onto the ground when the tyre is running. In other words, the wear potential is equal to the difference between the tread pattern depth of the tyre, in this instance equal to 7.0 mm when new, and the radial height of the regulation wear indicator, in this instance equal to 1.6 mm.

The tread of the tyre comprises a tread layer, intended to come into contact with the ground when the tyre is running via a tread surface, and a backing layer for the tread layer, arranged radially on the inside of the tread layer. The tread layer comprises an elastomeric tread material and the backing layer comprises an elastomeric backing material that is different from the elastomeric tread material. Thus, the tread layer and the backing layer are contiguous via an interface describing an interface trajectory in a meridian section plane of the tyre.

The backing layer is intended not to come into contact with the ground when the tyre is running, at least as long as the regulation wear threshold has not been reached. In other words, by defining, in the meridian plane, a regulation wear trajectory that is parallel to the tread surface of the tyre when new and passes through the radially outermost point of the regulation wear indicator, the interface trajectory located radially below the tread pattern blocks is arranged, in the meridian plane, radially on the inside of the regulation wear trajectory.

The MICHELIN Primacy 4 tyre described above in particular exhibits a very small rolling resistance. This is because each elastomeric tread and backing material exhibits a dynamic loss, respectively denoted tanDMAX23_1, tanDMAX23_2 and measured in accordance with the standard ASTM D-5992-96 at a temperature of 23° C. and a frequency of 10 Hz, which is relatively small and equal to 0.38 and 0.15, respectively.

The search for relatively small dynamic loss values tanD-MAX23_1, tanDMAX23_2 in order to obtain a very small rolling resistance has the result that, once half of the wear potential has been exceeded, the braking performance on wet ground is impaired in relation to the new tyre.

A subject of the invention is a tyre which, once half of its wear potential has been exceeded, exhibits improved braking performance on wet ground in relation to that of the tyre of the prior art.

SUMMARY

To that end, the subject of the invention is a tyre for a passenger vehicle, comprising a tread comprising cuts and tread pattern blocks, the cuts separating the tread pattern blocks from one another, the tread being intended to come into contact with the ground when the tyre is running via a tread surface, the tread comprising at least one regulation wear indicator defining a regulation wear threshold, and, in an axially central portion of the tread having an axial width equal to at least 70% of the width of the tread surface, the tread comprises:

a tread layer bearing the tread surface, the tread layer comprising an elastomeric tread material exhibiting:

a complex dynamic shear modulus $G^*\_1$, measured at 10% strain in accordance with the standard ASTM D-5992-96, at a temperature of 23° C. and a frequency of 10 Hz, and a dynamic loss tanD0_1, measured in accordance with the standard ASTM D-5992-96, at a temperature of 0° C. and a frequency of 10 Hz, a backing layer for the tread layer arranged radially on the inside of the tread layer, the backing layer comprising an elastomeric backing material exhibiting:

a complex dynamic shear modulus $G^*\_2$, measured at 10% strain in accordance with the standard ASTM D-5992-96, at a temperature of 23° C. and a frequency of 10 Hz, and a dynamic loss tanD0_2, measured in accordance with the standard ASTM D-5992-96, at a temperature of 0° C. and a frequency of 10 Hz, the elastomeric tread material being different from the elastomeric backing material such that the tread layer and the backing layer are contiguous via an interface describing an interface trajectory in a meridian section plane comprising the regulation wear indicator, characterized in that tanD0_2≥0.37×tanD0_1 and $G^*\_2$≥0.90×$G^*\_1$, in that, in the axially central portion of the tread, by defining, in the meridian section plane, a regulation wear trajectory that is parallel to the tread surface of the tyre when new and passes through the radially outermost point of the regulation wear indicator, at least 75% of the length of the interface trajectory located radially below the tread pattern blocks is arranged, in the meridian section plane, radially on the inside of the regulation wear trajectory, and in that, in the axially central portion of the tread, at least 75% of the length of the interface trajectory located radially below the tread pattern blocks is arranged, in the meridian section plane, at a mean radial distance less than or equal to 2.0 mm from the regulation wear trajectory.

Once half of its wear potential has been exceeded, the tyre according to the invention exhibits significantly improved braking performance on wet ground in relation to that of the tyre of the prior art, as shown by the comparative tests described below.

The invention is notable in particular in that the backing layer, the vast majority of which is nevertheless not intended to come into contact with the ground when the tyre is running, makes it possible to improve the braking performance on wet ground of the tyre once half of its wear potential has been exceeded.

On the one hand, the dynamic loss tanD0 measured at 0° C. makes it possible to characterize the grip potential on wet ground. This is because, when the tyre is running on wet ground exhibiting irregularities, the tread deforms to conform to the tops of the irregularities, forming indenting bodies. Once the tyre has exceeded half of its wear potential, the backing layer acts on this indentation mechanism all the more effectively if the dynamic loss tanD0, measured at 0° C., of the backing layer is relatively high in relation to the dynamic loss tanD0, measured at 0° C., of the tread layer. Thus, by meeting the characteristic according to which tanD0_2≥0.37×tanD0_1, the grip potential of the tyre on wet ground once it has exceeded half of its wear potential is improved.

On the other hand, the complex dynamic shear modulus G*, measured at 10% strain at 23° C., characterizes the stiffness of a layer and therefore the capacity of this layer to combat deformation of the tread under the effect of the water pressure when the tyre is running on wet ground. This tread deformation mechanism is known as blistering and can lead to a loss of contact of part of the contact patch with the ground and therefore reduce the grip of the tyre. Once the tyre has exceeded half of its wear potential, the backing layer acts on this blistering mechanism all the more effectively if the complex dynamic shear modulus G*, measured at 10% strain at 23° C., of the backing layer is relatively high in relation to the complex dynamic shear modulus G*, measured at 10% strain at 23° C., of the tread layer. Thus, by meeting the characteristic according to which G*_2≥0.90×G*_1, the stiffness of the backing layer and therefore that of the tread once it has exceeded half of its wear potential is improved.

It should be noted that, according to the invention, it is necessary to control the grip potential and the stiffness of the tread. This is because improving the grip potential on wet ground is only advantageous if the tread is correctly placed on the ground, and vice versa.

The complex shear modulus G* is a dynamic property which is well known to a person skilled in the art and is measured on a Metravib VA4000 viscosity analyser using test specimens extracted from the tyre. A recording is taken of the response of test specimens subjected to a simple alternating sinusoidal shear stress, at a frequency of 10 Hz, under standard temperature conditions (in this instance 23° C.) in accordance with the standard ASTM D1349-99. A strain amplitude sweep is carried out from 0.1% to 100% (outward cycle) and then from 100% to 0.1% (return cycle). The test specimen has a cylindrical cross section as described in the standard ASTM D 5992-96 (version published in September 2006, initially approved in 1996) in Figure X2.1 (circular version) and has a diameter of 10 mm [0 to +0.04 mm] and a thickness of 2 mm [1.85-2.20]. The complex dynamic shear modulus G* is defined as the square root of the sum of the square of G' and the square of G", with G' representing the modulus of elasticity and G" representing the modulus of viscosity. A measurement is then taken of the complex shear modulus G* at 10% strain over the return cycle.

The dynamic loss tanD0 is another dynamic property which is well known to a person skilled in the art and is measured on this same Metravib VA4000 viscosity analyser using identical test specimens extracted from the tyre. In order to determine this property, a temperature sweep is carried out on a temperature gradient increasing by 1.5° C. per minute, from a temperature Tmin below the glass transition temperature Tg of the material up to a temperature Tmax which may correspond to the rubber plateau of the elastomeric material. Before beginning the sweep, the sample is stabilized at the temperature Tmin for 20 minutes in order to have a uniform temperature throughout the test specimen. For each temperature value, a recording is made of the response of the test specimen subjected to simple alternating sinusoidal shear stress, at a frequency of 10 Hz, until a stress representative of the point of operation of the elastomeric material in the tyre is reached, in this instance 0.7 MPa. The value of the dynamic loss tanD0 is the measurement taken for the temperature value equal to 0° C.

The dynamic loss tanDMAX23 is yet another dynamic property which is well known to a person skilled in the art and is measured on this same Metravib VA4000 viscosity analyser using identical test specimens extracted from the tyre. A recording is taken of the response of the test specimen subjected to a simple alternating sinusoidal shear stress, at a frequency of 10 Hz, under determined temperature conditions (in this instance 23° C.) in accordance with the standard ASTM D1349-99. A strain amplitude sweep is carried out from 0.1% to 100% (outward cycle) and then from 100% to 0.1% (return cycle). The tangent of the phase angle D between the force exerted on the sample and the displacement thereof, expressed as a dynamic loss, is equal to the ratio G"/G'. The maximum value tanDMAX of the tangent of the phase angle D observed on the strain return cycle is recorded.

The feature according to which at least 75% of the length of the interface trajectory located radially below the tread pattern blocks is arranged, in the meridian section plane, radially on the inside of the regulation wear trajectory characterizes the fact that a vast majority of the backing layer is intended to not come into contact with the ground when the tyre is running, at least as long as the regulation wear threshold has not been reached. By contrast to the tyre of the prior art, in the tyre according to the invention, the backing layer may be made to come into contact with the ground locally, that is to say over at most 25% of the length of the interface trajectory located radially below the tread pattern blocks. This is because, due to the relatively high value of the dynamic loss tanD0_2 of the backing layer, the grip potential afforded by this backing layer, in the case of contact with the ground, would be greater than the grip potential afforded by the backing layer of the tyre of the prior art if the latter were to come into contact with the ground. In other words, if the backing layer of the tyre according to the invention comes into contact with the ground, the grip potential would not be significantly impaired.

This feature is particularly advantageous since it makes it possible to avoid scrapping tyres in which a small but non-negligible part of the backing layer rises radially above the regulation wear trajectory. Such radial rising is observed in particular close to the cuts, the moulding of which causes an outward axial flow of the elastomeric tread and backing materials located radially below the cuts, and consequently an outward radial flow of the elastomeric tread and backing materials located radially close to the cuts.

In addition, the feature according to which the specific arrangement of the tread and backing layers and the properties of the tread and backing materials according to the invention over the axially central portion of the tread are observed makes it possible to reflect the fact that the invention requires an arrangement and properties of the materials over a significant axial portion of the tread intended to come into contact with the ground, in this instance at least equal to 70% of the width of the tread surface. The axially central portion comprises the median plane of the tyre.

In a first preferred variant, and in accordance with the invention, the axially central portion of the tread has an axial width equal to the axial width of the tread. In other words, the axially central portion of the tread has an axial width equal to 100% of the width of the tread surface.

In a second variant, also in accordance with the invention, the axially central portion of the tread has an axial width strictly less than the axial width of the tread surface such that the tread comprises axially lateral portions arranged axially on the outside of the axially central portion, each axially lateral portion having an axial width at most equal to 15% of the axial width of the tread. In a first configuration of this second variant, the axially lateral portions have a specific arrangement different from that of the axially central portion. In a second configuration of this second variant, the axially lateral portions exhibit material properties different from those of the axially central portion.

Conventionally, the tread surface is determined on a tyre mounted on a nominal rim and inflated to the nominal pressure. In the event of an obvious boundary between the tread surface and the rest of the tyre, the axial width of the tread surface is simply measured. If the tread surface is continuous with the outer surfaces of the sidewalls of the tyre, the axial limit of the tread surface passes through the point at which the angle between the tangent to the tread surface and a straight line parallel to the axial direction passing through this point is equal to 30°. When, in a meridian section plane, there are several points for which said angle is equal, in terms of absolute value, to 30°, it is the radially outermost point that is adopted.

The interface trajectory located radially below the tread pattern blocks is axially delimited by two straight lines which are perpendicular to the tread surface and pass through the axial ends of each tread pattern block that is part of the tread surface when the tyre is new.

In accordance with the invention, it is necessary for the backing layer to not be too far away from the tread surface in a radial direction once the tyre has exceeded half of its wear potential, such that this backing layer has a significant effect on the indentation and blistering mechanisms described above. Thus, a significant part of the length of the interface trajectory located radially below the tread pattern blocks, in this instance at least 75%, is arranged, in the meridian section plane, at a relatively small distance from the regulation wear trajectory, in this instance at a distance less than or equal to 2.0 mm. In order to determine the mean radial distance between the interface trajectory and the regulation wear trajectory, the mean of the radial distances between the interface trajectory and the regulation wear trajectory measured regularly along the interface trajectory located radially below the tread pattern blocks, for example every millimetre, will be taken.

The fact that the tread and backing layers are contiguous in particular characterizes the fact that the tread and backing materials are in direct contact with one another along the interface and that no other material is radially interposed between the tread and backing layers.

In order to determine the length of the interface trajectory located radially below the tread pattern blocks, a measurement is taken, in the meridian section plane, of the curvilinear length of the interface trajectory arranged radially below the tread surface, this implicitly excluding the length of the interface trajectory arranged radially below the various cuts which, for their part, do not have a surface intended to come into contact with the ground.

In order to determine whether a length of the interface trajectory located radially below the tread pattern blocks is arranged radially on the inside or on the outside of the regulation wear trajectory, for each point on the interface trajectory a determination is made as to whether its radial projection onto the regulation wear trajectory is located radially on the inside or on the outside of this point. In an analogous way, to determine the distance between the interface trajectory located radially below the tread pattern blocks and the regulation wear trajectory, for each point on the interface trajectory the distance between this point on the interface trajectory and its radial projection onto the regulation wear trajectory is determined.

The geometric features described in the present application can be simply determined in a meridian section of the tyre.

An elastomeric material is a material exhibiting elastomeric behaviour. Such a material is advantageously obtained by crosslinking a crosslinkable composition comprising at least one elastomer and at least one other component. Preferably, the crosslinkable composition comprising at least one elastomer and at least one other component comprises an elastomer, a crosslinking system and a filler. The crosslinkable compositions used for the tread and backing layers are conventional compositions for tyre treads, typically based on a diene elastomer, a reinforcing filler, such as carbon black and/or a silica, a vulcanization system and conventional additives.

In order to make it possible in particular to discharge water and ensure good grip performance on wet ground, the tread of the tyre according to the invention comprises cuts. A cut denotes either a well, or a groove, or a sipe and forms a space opening onto the tread surface.

On the tread surface, a sipe or a groove has two characteristic main dimensions: a width W and a length Lo, such that the length Lo is at least equal to twice the width W. A sipe or a groove is therefore delimited by at least two main lateral faces that determine its length Lo and are connected by a bottom face, the two main lateral faces being distant from one another by a non-zero distance referred to as the width W of the cut. On a new tyre, the width W of the cut is the maximum distance between the two main lateral faces measured, when the cut is not chamfered, at a radial side coincident with the tread surface and, when the cut is chamfered, at the radially outermost radial side of the cut and radially innermost side of the chamfer. On a new tyre, the depth of the cut is the maximum radial distance between the bottom of the cut and its projection onto the ground when the tyre is running. The maximum value for the depths of the cuts is referred to as the tread pattern depth.

A sipe is such that the distance between the main lateral faces is suitable for allowing the main lateral faces that delimit the said sipe to come into at least partial contact in the contact patch, in particular when the tyre is new and under normal running conditions, these notably including the fact that the tyre is under nominal load and at nominal pressure. In general, the width of a sipe is less than or equal to 2 mm.

A groove is such that the distance between the main lateral faces is such that these main lateral faces cannot come into contact with one another under normal running conditions, these notably including the fact that the tyre is under nominal load and at nominal pressure. In general, the width of a groove is strictly greater than 2 mm, preferably greater than or equal to 5 mm, and more preferentially greater than or equal to 8 mm.

A groove may in particular be a circumferential groove, that is to say a groove extending in a main direction that forms an angle less than or equal to 30°, preferably less than or equal to 10°, with the circumferential direction of the tyre. A circumferential groove may be continuous, that is to say not interrupted by a tread pattern block or another cut so that the two main lateral faces that determine its length are uninterrupted over a full circuit of the tyre. A circumferential groove may equally be discontinuous, that is to say interrupted by one or more tread pattern blocks and/or one or more other cuts so that the two main lateral faces that determine its length are interrupted by one or more tread pattern blocks and/or one or more other cuts. In general, the depth of a circumferential groove of the tyre when new is greater than or equal to 85%, preferably 90%, of the tread pattern depth. Very conventionally, the depth of a circumferential groove of the tyre when new is greater than or equal to 4.0 mm, preferably greater than or equal to 5.0 mm, and more preferentially greater than or equal to 5.5 mm. The cuts separating the tread pattern blocks of the tyre according to the invention are very preferentially circumferential grooves.

The tyre according to the invention has a substantially toric shape about an axis of revolution substantially coincident with the axis of rotation of the tyre. This axis of revolution defines three directions conventionally used by a person skilled in the art: an axial direction, a circumferential direction and a radial direction.

The expression "axial direction" means the direction substantially parallel to the axis of revolution of the tyre, that is to say the axis of rotation of the tyre.

The expression "circumferential direction" means the direction that is substantially perpendicular both to the axial direction and to a radius of the tyre (in other words, tangent to a circle centred on the axis of rotation of the tyre).

The expression "radial direction" means the direction along a radius of the tyre, that is to say any direction that intersects the axis of rotation of the tyre and is substantially perpendicular to that axis.

The median plane of the tyre (denoted M) is understood to be the plane perpendicular to the axis of rotation of the tyre, which is located axially mid-way between the two beads and passes through the axial middle of the crown reinforcement.

The equatorial circumferential plane of the tyre (denoted E) is understood to be a meridian section plane, the plane passing through the equator of the tyre, perpendicular to the median plane and to the radial direction. The equator of the tyre is, in a meridian section plane (plane perpendicular to the circumferential direction and parallel to the radial and axial directions), the axis that is parallel to the axis of rotation of the tyre and located equidistantly between the radially outermost point of the tread that is intended to be in contact with the ground and the radially innermost point of the tyre that is intended to be in contact with a support, for example a rim, the distance between these two points being equal to H.

The meridian plane is understood to be a plane that is parallel to and contains the axis of rotation of the tyre and is perpendicular to the circumferential direction.

"Radially inside" and "radially outside" mean "closer to the axis of rotation of the tyre" and "further away from the axis of rotation of the tyre", respectively. "Axially inside" and "axially outside" mean "closer to the median plane of the tyre" and "further away from the median plane of the tyre", respectively.

A bead is understood to be the portion of the tyre intended to allow the tyre to be attached to a mounting support, for example a wheel comprising a rim. Thus, each bead is notably intended to be in contact with a flange of the rim allowing it to be attached.

Any interval of values denoted by the expression "between a and b" represents the range of values ranging from more than a to less than b (that is to say, limits a and b excluded) whereas any interval of values denoted by the expression "from a to b" means the range of values ranging from a up to b (that is to say, including the strict limits a and b).

The tyres of the invention are intended for passenger vehicles as defined according to the European Tyre and Rim Technical Organisation, or "ETRTO", standard of 2019. Such a tyre has a section in a meridian section plane that is characterized by a section height H and a nominal section width S, according to the European Tyre and Rim Technical Organisation, or "ETRTO", standard of 2019.

The tyres of the invention are preferentially intended for passenger vehicles. Such a tyre has a section in a meridian section plane characterized by a nominal section width S and a section height H, according to the European Tyre and Rim Technical Organisation (designated by the acronym "ETRTO") standard in Standards Manual 2019, such that the ratio H/S, expressed as a percentage, is at most equal to 90, preferably at most equal to 80 and more preferentially at most equal to 70 and is at least equal to 30, preferably at least equal to 40, and the nominal section width S is at least equal to 115 mm, preferably at least equal to 155 mm and more preferentially at least equal to 175 mm and at most equal to 385 mm, preferably at most equal to 315 mm, more preferentially at most equal to 285 mm and even more preferentially at most equal to 255 mm. In addition, the diameter D at the rim flange, defining the diameter of the mounting rim of the tyre, is at least equal to 12 inches, preferably at least equal to 16 inches and at most equal to 24 inches, preferably at most equal to 20 inches.

As explained above, even though the backing layer does not significantly impair the grip potential if this backing layer comes into contact with the ground, it is preferable to minimize the proportion of this backing layer that can come into contact with the ground. Thus, advantageously, at least 80% and preferably at least 90% of the length of the interface trajectory located radially below the tread pattern blocks is arranged, in the meridian section plane, radially on the inside of the regulation wear trajectory.

In order to maximize the effect of the backing layer on the indentation and blistering mechanisms, it will be understood that it is preferable for the largest possible proportion of the backing layer to be located relatively close to the regulation wear trajectory in a radial direction. Thus, advantageously, at least 80% and preferably at least 90% of the length of the interface trajectory located radially below the tread pattern blocks is arranged, in the meridian section plane, at a radial distance less than or equal to 2.0 mm.

Still with the aim of maximizing the effect of the backing layer on the indentation and blistering mechanisms, it will be understood that it is preferable for the backing layer to be located radially closest to the regulation wear trajectory regardless of the proportion of this backing layer. Thus, at least 75%, preferably at least 80% and more preferentially at least 90% of the length of the interface trajectory located radially below the tread pattern blocks is arranged, in the meridian section plane, at a radial distance advantageously less than or equal to 1.2 mm, and more preferentially less than or equal to 1.0 mm from the regulation wear trajectory In order to improve the effect of the backing layer on the indentation mechanism, in an advantageous embodiment it is the case that $tanD0\_2 \geq 0.5 \times tanD0\_1$, preferably $tanD0\_2 \geq 0.75 \times tanD0\_1$ and more preferentially $tanD0\_2 \geq tanD0\_1$, even more preferentially $tanD0\_2 \geq tanD0\_1$, and very preferentially $tanD0\_2 \geq 1.10 \times tanD0\_1$. Specifically, the greater the increase in the value $tanD0\_2$, the more the grip potential of the tyre on wet ground once it has exceeded half of its wear potential is improved. In the more preferential and very preferential cases in which $tanD0\_2 > tanD0\_1$ and $tanD0\_2 \geq 1.10 \times tanD0\_1$, if the backing layer of the tyre according to the invention comes into contact with the ground, the grip potential not only is not significantly impaired, but quite by contrast is actually improved.

In order to improve the effect of the backing layer on the blistering mechanism, in an advantageous embodiment it is the case that $G*\_2 \geq 0.92 \times G*\_1$, preferably $G*\_2 \geq G*\_1$, and more preferentially $G*\_2 > G*\_1$. Specifically, the greater the increase in the value $G*\_2$, the greater the increase in the stiffness of the backing layer and therefore that of the tread once it has exceeded half of its wear potential.

In a particular embodiment that makes it possible to maximize the effect of the backing layer on the indentation and blistering mechanisms, in the axially central portion of the tread, at least 75% of the length of the interface trajectory located radially below the tread pattern blocks is arranged, in the meridian section plane, radially on the outside of a trajectory which is parallel to the tread surface of the tyre when new and passes through the radially innermost point of the or each deepest cut. In other words, the interface trajectory is located on a radial side located in the axial continuation of the thickness of the regulation wear indicator. Specifically, the regulation wear indicator is arranged very preferentially at the bottom of the deepest cut or one of the deepest cuts.

If multiple cuts with the same depth are the deepest ones, the above feature is verified for each deepest cut comprising a regulation wear indicator.

In order to maximize the effect of the backing layer on the indentation and blistering mechanisms, it will be understood that it is preferable for the largest possible proportion of the backing layer to be located in the axial continuation of the thickness of the regulation wear indicator in a radial direction. Thus, advantageously, at least 80% and preferably at least 90% of the length of the interface trajectory located radially below the tread pattern blocks is arranged, in the meridian section plane, radially on the outside of a trajectory which is parallel to the tread surface of the tyre when new and passes through the radially innermost point of each deepest cut, or of each deepest cut if there are multiple cuts with the same depth, all of which are the deepest ones on the tread.

In order to avoid seeing the backing layer rise through the tread layer too often and therefore having to scrap non-compliant tyres because an excessively large proportion of their backing layer can come into contact with the ground, in the central axial portion of the tread, at least 75% of the length of the interface trajectory located radially below the tread pattern blocks is arranged, in the meridian section plane, at a mean radial distance greater than or equal to 0.4 mm, preferably greater than or equal to 0.6 mm, from the regulation wear trajectory. Moreover, for a given thickness of the tread, the volume of elastomeric backing material used is reduced by increasing the radial distance between the interface trajectory and the regulation wear trajectory.

So as to even further amplify the reduction in instances of rising and the minimization of the volume of elastomeric backing material used, advantageously at least 80% and preferably at least 90% of the length of the interface trajectory located radially below the tread pattern blocks is arranged, in the meridian section plane, at a radial distance greater than or equal to 0.4 mm, preferably greater than or equal to 0.6 mm, from the regulation wear trajectory.

In a particularly advantageous embodiment, in which local rising of the backing layer is permitted and the systematic scrapping of tyres in which a tiny part of the interface trajectory is located radially on the outside of the regulation wear trajectory is avoided, in the central axial portion of the tread, at least a non-zero length of the interface trajectory located radially below the tread pattern blocks is arranged, in the meridian section plane, radially on the outside of the regulation wear trajectory. In accordance with the invention, this length is at most equal to 25% of the length of the interface trajectory located radially below the tread pattern blocks.

In an embodiment that makes it possible to optimize the effect of the tread layer on the indentation mechanism, $tanD0\_1$ ranges from 0.50 to 1.00 and more preferentially ranges from 0.50 to 0.85.

In an embodiment that makes it possible to optimize the effect of the backing layer on the indentation mechanism, $tanD0\_2$ ranges from 0.60 to 1.10 and more preferentially ranges from 0.60 to 1.00.

In an embodiment that makes it possible to optimize the effect of the tread layer on the blistering mechanism, $G*\_1$ ranges from 1.30 MPa to 4.10 MPa, and preferably ranges from 1.30 MPa to 3.00 MPa.

In an embodiment that makes it possible to optimize the effect of the backing layer on the blistering mechanism, $G*\_2$ is greater than or equal to 2.00 MPa, preferably ranges from 2.00 MPa to 4.10 MPa, and more preferably ranges from 2.15 MPa to 3.50 MPa.

Conventionally, the tyre comprises a crown, two sidewalls and two beads, each sidewall connecting each bead to the crown. Again in the conventional way, the crown comprises the tread and a crown reinforcement arranged radially on the inside of the tread. The tyre also comprises a carcass reinforcement that is anchored in each bead and extends in each sidewall and radially on the inside of the crown.

Conventionally, the crown reinforcement comprises at least one crown layer comprising reinforcing elements. These reinforcing elements are preferably textile or metallic filamentary elements.

In embodiments that make it possible to obtain performance aspects of tyres referred to as radial tyres as defined by the ETRTO, the carcass reinforcement comprises at least one carcass layer, the or each carcass layer comprising carcass filamentary reinforcing elements, each carcass filamentary reinforcing element extending substantially in a main direction that forms an angle, in terms of absolute value ranging from 80° to 90°, with the circumferential direction of the tyre.

Advantageously, the tyre comprises a crown comprising a crown reinforcement arranged radially on the inside of the tread, in the axially central portion of the tread, the mean distance between the layer comprising the radially outermost reinforcing elements of the crown reinforcement and the radially innermost point of the or each deepest cut is less than or equal to 2.50 mm, preferably less than or equal to 2.25 mm. As explained above, when the tyre is being moulded, an outward axial flow of the elastomeric tread and backing materials located radially below the cuts, and consequently an outward radial flow of the elastomeric tread and backing materials located radially close to the cuts, is observed. These flows are all the more significant when the thickness of elastomeric material located radially on the outside of the crown reinforcement and radially on the inside of each cut and more particularly radially on the inside of the deepest cut is small. Because the invention permits local rising of the backing layer through the tread layer, it is possible to reduce the thickness of elastomeric material located radially on the outside of the crown reinforcement and radially on the inside of each cut and more particularly radially on the inside of the deepest cut. This reduction makes it possible to reduce the mass of the tyre but also its rolling resistance.

If multiple cuts with the same depth are the deepest ones, the above feature is verified for each deepest cut. With preference, since the deepest cut is a circumferential groove, in the axially central portion of the tread, the mean distance between the layer comprising the radially outermost reinforcing elements of the crown reinforcement and the radially innermost point of each circumferential groove is less than or equal to 2.50 mm, preferably less than or equal to 2.25 mm.

So as to nevertheless protect the crown reinforcement from external attack, the tire comprises a crown comprising a crown reinforcement arranged radially on the inside of the tread, in the axially central portion of the tread, the mean distance between the layer comprising the radially outermost reinforcing elements of the crown reinforcement and the radially innermost point of the or each deepest cut is greater than or equal to 1.0 mm.

If multiple cuts with the same depth are the deepest ones, the above features are verified for each deepest cut. With preference, since the deepest cut is a circumferential groove, in the axially central portion of the tread, the mean distance between the layer comprising the radially outermost reinforcing elements of the crown reinforcement and the radially innermost point of each circumferential groove is greater than or equal to 1.0 mm.

In order to determine the mean distance between the layer comprising the radially outermost reinforcing elements of the crown reinforcement and the radially innermost point of the or each deepest cut or of each circumferential groove, the mean of the straight-line distances between the layer comprising the radially outermost reinforcing elements of the crown reinforcement and the radially innermost point of the or each deepest cut or of each circumferential groove, for example every millimetre, will be taken.

The straight-line distance between the layer comprising the radially outermost reinforcing elements of the crown reinforcement and the radially innermost point of the or each deepest cut or of each circumferential groove is measured, in the meridian section plane, between the radially innermost point of the or each deepest cut or of each circumferential groove and its radial projection onto a trajectory passing through the radially outermost points of the reinforcing elements of the radially outermost crown layer.

In an embodiment that is easy to implement industrially, for example using extrusion means, the axial portion of the tread located radially below the or each deepest cut comprises a non-zero radial thickness of the tread layer and a non-zero radial thickness of the backing layer. With preference, in order to reduce the problems of unbalanced flows of the elastomeric materials underneath the cuts during the extrusion process, the ratio of the radial thickness of the tread layer to the radial thickness of the backing layer ranges from 0.40 to 0.60.

In an embodiment in which the backing layer is positioned only at that location where it makes it possible to improve grip performance on wet ground and therefore to minimize the amount of elastomeric backing material used, the axial portion of the tread located radially below the or each deepest cut is constituted by the tread layer. With preference, the axial portion of the tread located radially below each circumferential groove is constituted by the tread layer. In other words, there is no elastomeric backing material in the tread located radially below the or each deepest cut or radially below each circumferential groove.

In the embodiments described above, the axial portion of the tread located radially below the or each deepest cut or each circumferential groove is axially delimited by two straight lines which are perpendicular to the tread surface and pass through the axial ends of each of the tread pattern blocks that delimits the cut or each groove and is part of the tread surface when the tyre is new.

So as to obtain a tyre with as small a rolling resistance as possible, the elastomeric tread material exhibits a dynamic loss tanDMAX23_1, measured in accordance with the standard ASTM D-5992-96, at a temperature of 23° C. and a frequency of 10 Hz, ranging from 0.13 to 0.70 and preferably from 0.13 to 0.47. This is because the dynamic loss tanDMAX23, measured at 23° C. and at a frequency of 10 Hz, characterizes the hysteresis of an elastomeric material and therefore its rolling resistance.

Analogously, so as to minimize the impact of the backing layer on the rolling resistance of the tyre, the elastomeric backing material exhibits a dynamic loss tanDMAX23_2, measured in accordance with the standard ASTM D-5992-96, at a temperature of 23° C. and a frequency of 10 Hz, ranging from 0.13 to 0.53 and preferably from 0.13 to 0.46.

As already described above, the regulation wear indicator is arranged very preferentially at the bottom of the deepest cut. The wear indicator is very preferentially arranged at the bottom of a circumferential groove.

In an embodiment which is particularly simple to implement, the wear indicator is formed by a protuberance extending radially from the bottom of the cut radially outwards over a radial height ranging from 1.45 mm to 1.75 mm and preferably substantially equal to 1.6 mm.

Advantageously, so as to give the tyre a relatively great wear potential and therefore increased longevity, the tread pattern height of the tyre when new ranges from 5.0 to 9.0 mm, preferably from 6.0 to 7.5 mm. The maximum value of the depths of the cuts is the tread pattern height.

So as to make it possible to effectively discharge water when running on wet ground, the surface-area void ratio of the tyre exhibiting a tread pattern height equal to 2.0 mm after wear ranges from 20% to 35%, preferably from 22% to 30%. The use of a backing layer in accordance with the invention is all the more advantageous in the case of a tyre exhibiting such a surface-area void ratio after wear inasmuch as this backing layer makes it possible to compensate the drop in water discharge capacity that occurs with wear, this drop being all the greater if the surface-area void ratio is small.

The surface-area void ratio of the tyre is the ratio of:
  the difference between the total surface area AT of the contact patch of the tread of the tyre inflated to nominal pressure and under nominal load over which the tyre is in contact with smooth ground, for example a pane of glass, and the surface area AC of elements of the tread that make contact with the ground on which the tyre runs, and
  the total surface area AT of the contact patch of the tread of the tyre inflated to nominal pressure and under nominal load over which the tyre is in contact with smooth ground.

In order to determine the surface-area void ratio, the nominal load is equal to 80% of the load rating given by the European Tyre and Rim Technical Organization or "ETRTO" standard of 2019, and the nominal pressure is equal to 2.5 bar.

So as to minimize the amount of elastomeric backing material used, the volume of the elastomeric tread material in the axially central portion of the tread is greater than or equal to 60%, preferably greater than or equal to 65%, of the volume of the axially central portion of the tread, and the volume of the elastomeric backing material in the axially central portion of the tread is less than or equal to 40%, preferably less than or equal to 35%, of the volume of the axially central portion of the tread.

In an embodiment which is particularly advantageous from the point of view of industrial complexity and the process for manufacturing the tread, at least 90% of the volume of the axially central portion of the tread is made from the tread material and the backing material. In the possibly remaining volume of the axially central portion of the tread, which may range up to at most 10% of the volume of the axially central portion of the tread, the tread may comprise a layer of small axial thickness, less than 0.4 mm, arranged between the radially outermost layer of the crown reinforcement and the backing layer in order to provide the connection between these two layers. In addition, the tread may likewise comprise a strip that has a small axial width and is made of an electrically conductive material, forming a conductive pathway between the ground on which the tyre is running and the crown reinforcement, in order to enable the tyre to meet electrical conductivity standards.

In an embodiment in which the backing layer protrudes axially into the axially lateral portions arranged axially on the outside of the axially central portion of the tread and makes it possible to have an effect on the indentation and blistering mechanisms described above outside the axially central portion, the axial width of the backing layer is greater than or equal to 90% of the axial width of the tread surface, preferably the axial width of the backing layer is greater than or equal to 100% of the axial width of the tread surface.

In another embodiment, in which the backing layer is axially limited to the central part so as to minimize the amount of elastomeric backing material used, the axial width of the backing layer is less than or equal to 90% of the width of the tread.

BRIEF DESCRIPTION OF THE FIGURES

The invention and its advantages will be easily understood in the light of the detailed description and the nonlimiting exemplary embodiments which follow, and from FIGS. 1 to 8, which relate to these examples and in which.

DETAILED DESCRIPTION

A frame of reference X, Y, Z corresponding to the usual axial (Y), radial (Z) and circumferential (X) directions, respectively, of a tyre is shown in the figures relating to the tyre.

Figures 1, 2:
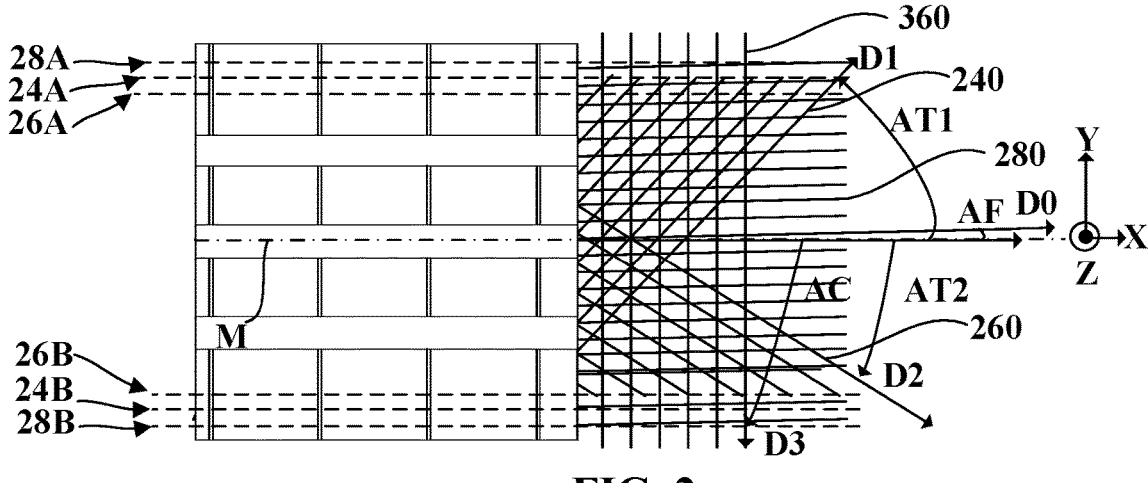
FIG. 1 is a view in a meridian section plane of a tyre according to a first embodiment of the invention.
FIG. 2 is a cutaway view of the tyre of FIG. 1, illustrating the arrangement of filamentary reinforcing elements in and under the crown.

FIG. 1 shows a tyre according to the invention and denoted by the general reference 10. The tyre 10 has a substantially toric shape about an axis of revolution substantially parallel to the axial direction Y. The tyre 10 is intended for a passenger vehicle and has the size 225/45 R17. In the various figures, the tyre 10 is depicted as new, which is to say when it has not yet been run.

The tyre 10 comprises a crown 12 comprising a tread 14 intended to come into contact with the ground when it is running and a crown reinforcement 16 extending in the crown 12 in the circumferential direction X. The tyre 10 also comprises an airtight layer 18 with respect to an inflation gas that is intended to delimit an internal cavity closed with a mounting support for the tyre 10 once the tyre 10 has been mounted on the mounting support, for example a rim.

The crown reinforcement 16 comprises a working reinforcement 20 and a hoop reinforcement 22. The working reinforcement 16 comprises at least one working layer and in this case comprises two working layers 24, 26. In this particular instance, the working reinforcement 16 is made up of the two working layers 24, 26. The radially inner working reinforcement 24 is arranged radially on the inside of the radially outer working layer 26.

The hoop reinforcement 22 comprises at least one hooping layer and in this case comprises one hooping layer 28. The hoop reinforcement 22 is in this case made up of the hooping layer 28.

The crown reinforcement 16 is surmounted radially by the tread 14. In this case, the hoop reinforcement 22, in this case the hooping layer 28, is arranged radially on the outside of the working reinforcement 20 and is therefore interposed radially between the working reinforcement 20 and the tread 14. Preferably, it may be conceivable for the hoop reinforcement 22 to have an axial width at least as large as the axial width of the working reinforcement 20 and, in this particular instance, in the embodiment illustrated in FIG. 1, the hoop reinforcement 22 has an axial width greater than the axial width of the working reinforcement 20.

The tyre 10 comprises two sidewalls 30 that extend the crown 12 radially inwards. The tyre 10 also has two beads 32 radially on the inside of the sidewalls 30. Each sidewall 30 connects each bead 32 to the crown 12.

The tyre 10 comprises a carcass reinforcement 34 anchored in each bead 32 and, in this particular instance, wrapped around a bead wire 33. The carcass reinforcement 34 extends in each sidewall 30 and radially on the inside of the crown 12. The crown reinforcement 16 is arranged radially between the tread 14 and the carcass reinforcement 34. The carcass reinforcement 34 comprises at least one carcass layer and in this case comprises a single carcass layer 36. In this particular instance, the carcass reinforcement 34 is made up of the single carcass layer 36.

Each working layer 24, 26, hooping layer 28 and carcass layer 36 comprises an elastomer matrix in which one or more filamentary reinforcing elements of the corresponding layer are embedded. These layers will now be described with reference to FIG. 2.

The hoop reinforcement 22, in this case the hooping layer 28, is delimited axially by two axial edges 28A, 28B of the hoop reinforcement 22. The hoop reinforcement 22 comprises one or more hooping filamentary reinforcing elements 280 wound circumferentially in a helix so as to extend axially from the axial edge 28A to the other axial edge 28B of the hooping layer 28 in a main direction D0 of each hooping filamentary reinforcing element 280. The main direction D0 forms, with the circumferential direction X of the tyre 10, an angle AF which, in terms of absolute value, is less than or equal to 10°, preferably less than or equal to 7° and more preferably less than or equal to 5°. In this case, AF=−5°. The hooping layer 28 comprises a density of 98 hooping filamentary reinforcing elements per decimetre of hooping layer, this density being measured perpendicular to the direction D0.

The radially inner working layer 24 is delimited axially by two axial edges 24A, 24B. The radially inner working layer 24 comprises working filamentary reinforcing elements 240 extending axially from the axial edge 24A to the other axial edge 24B in a manner substantially parallel to one another along a main direction D1. Similarly, the radially outer working layer 26 is delimited axially by two axial edges 26A, 26B. The radially outer working layer 26 comprises working filamentary reinforcing elements 260 extending axially from the axial edge 26A to the other axial edge 26B in a manner substantially parallel to one another along a main direction D2. The main direction D1 in which each working filamentary reinforcing element 240 of the radially inner working layer 24 extends and the main direction D2 in which each working filamentary reinforcing element 260 of the other of the radially outer working layer 26 extends form angles AT1 and AT2, respectively, of opposite orientations with the circumferential direction X of the tyre 10. Each main direction D1, D2 forms an angle AT1, AT2, respectively, in terms of absolute value, strictly greater than 10°, preferably ranging from 15° to 50° and more preferably ranging from 15° to 30°, with the circumferential direction X of the tyre 10. In this case, AT1=−26° and AT2=+26°.

The carcass layer 36 is delimited axially by two axial edges 36A, 36B. The carcass layer 36 comprises carcass filamentary reinforcing elements 360 extending axially from the axial edge 36A to the other axial edge 36B of the carcass layer 36 in a main direction D3 forming an angle AC, in terms of absolute value, greater than or equal to 60°, preferably ranging from 80° to 90° and in this case AC=+90°, with the circumferential direction X of the tyre 10.

Each hooping filamentary reinforcing element 280 conventionally comprises two multifilament plies, each multifilament ply being made up of a spun yarn of aliphatic polyamide, in this instance nylon, monofilaments with a thread count equal to 140 tex, these two multifilament plies being twisted in a helix individually at 250 turns per metre in one direction and then twisted together in a helix at 250 turns per metre in the opposite direction. These two multifilament plies are wound in a helix around one another. As an alternative, use could be made of a hooping filamentary reinforcing element 280 comprising one multifilament ply made up of a spun yarn of aliphatic polyamide, in this case nylon, monofilaments with a thread count equal to 140 tex, and one multifilament ply made up of a spun yarn of aromatic polyamide, in this case aramid, monofilaments with a thread count equal to 167 tex, these two multifilament plies being twisted in a helix individually at 290 turns per metre in one direction and then twisted together in a helix at 290 turns per metre in the opposite direction. These two multifilament plies are wound in a helix around one another.

Each working filamentary reinforcing element 180 is an assembly of two steel monofilaments wound in a helix with a pitch of 1.2 or 1.05 mm, each steel monofilament having a diameter equal to 0.30 mm. In another embodiment, each working filamentary reinforcing element 180 is made up of a steel monofilament having a diameter equal to 0.30 mm. More generally, the steel monofilaments have diameters ranging from 0.25 mm to 0.32 mm.

Each carcass filamentary reinforcing element 340 conventionally comprises two multifilament plies, each multifilament ply being made up of a spun yarn of polyester, in this case PET, monofilaments, these two multifilament plies being twisted in a helix individually at 240 turns per metre in one direction and then twisted together in a helix at 240 turns per metre in the opposite direction. Each of these multifilament plies has a thread count equal to 220 tex. In other variants, it would be possible to use thread counts equal to 144 tex or 334 tex.

Figure 6:
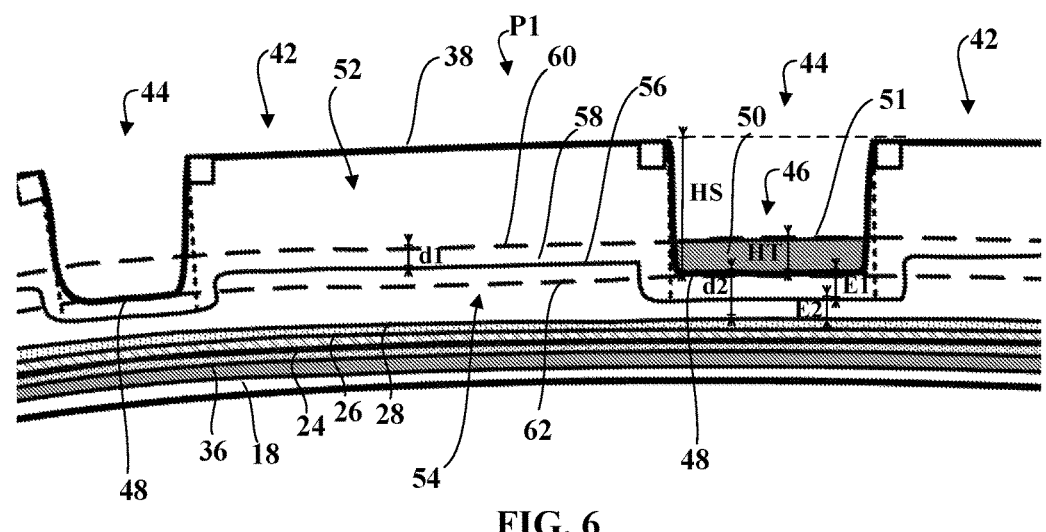

With reference to FIG. 1, the tread 14 comprises a tread surface 38 by means of which the tread 14 comes into contact with the ground. The tread 14 also comprises cuts 40 and tread pattern blocks 42, the cuts 40 separating the tread pattern blocks 42 from one another. In the meridian section plane of FIG. 1, the cuts 40 comprise multiple circumferential grooves 44, at least one of which forms the deepest cut of the tyre 10. The depth of this deepest circumferential groove 44, when the tyre is new, defines the tread pattern height HS of the tyre, which ranges from 5.0 to 9.0 mm, preferably from 6.0 to 7.5 mm, and in this instance HS=7.0 mm, as illustrated in FIG. 6.

The tread surface 38 is intended to come into contact with the ground when the tyre 10 is running along the ground and is delimited axially by two axial limits 39 passing through each point N arranged on each side of the median plane M and for which the angle between the tangent T to the tread surface 38 and a straight line R parallel to the axial direction Y passing through this point is equal to 30°.

In this instance, the tread 14 comprises an axially central portion P1 which comprises the median plane of the tyre 10 and in this case is centred axially on the median plane M of the tyre 10. The axially central portion P1 has an axial width L1 equal to at least 70% of the axial width L of the tread surface 38, and in this instance L1=L.

The tread 14 also comprises multiple regulation wear indicators 46 defining a regulation wear threshold below which the tyre does not comply with the corresponding regulations in terms of wear. The wear indicator 46 illustrated in FIGS. 1 and 3 to 6 is arranged at the bottom 48 of the deepest cut, in this case at the bottom 48 of one of the circumferential grooves 44. In this particular instance, the regulation wear indicator 46 is formed by a protuberance 50 extending radially from the bottom 48 of the circumferential groove 44 radially outwards over a radial height HT ranging from 1.45 mm to 1.75 mm, and in this case substantially equal to 1.6 mm. The regulation wear indicator 46 has a radially outermost point, in this case formed by the radially outer surface 51 of the regulation wear indicator 46.

After wear has occurred to a tread pattern height equal to 2.0 mm, the surface-area void ratio of the tyre ranges from 20% to 35%, preferably from 22% to 30%, and in this case is equal to 25%.

Figure 3:
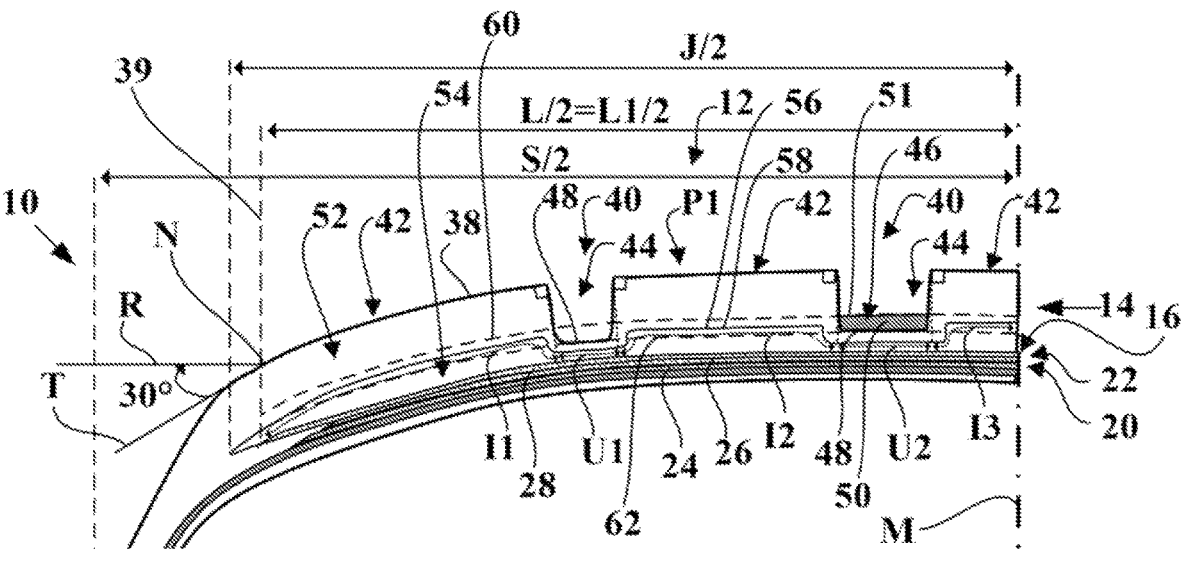
FIGS. 3 to 6 are views of details of the crown of the tyre of FIG. 1,
  FIGS. 7 and 8 are views similar to that of FIG. 3 of tyres according to second and third embodiments, respectively.

With reference to FIGS. 1 and 3, the tread 14 comprises a tread layer 52 bearing the tread surface 38 and a backing layer 54 for the tread layer 52 arranged radially on the inside of the tread layer 52. Such a backing layer 54 is generally referred to as underlayer. The axial width J of the backing layer 54 is greater than or equal to 90% of the axial width L of the tread surface 38 and in this case the axial width J of the backing layer 54 is greater than or equal to 100% of the axial width L of the tread surface 38 and in this case equal to 105% of the axial width L of the tread surface 38.

The tread layer 52 and the backing layer 54 are contiguous via an interface 56 describing an interface trajectory 58 in the meridian section plane of FIG. 3 comprising the regulation wear indicator 46.

Still in the meridian section plane of FIG. 3, a regulation wear trajectory 60 which is parallel to the tread surface 38 of the tyre 10 and passes through the radially outer surface 51 of the regulation wear indicator 46 is defined. In FIG. 3, the regulation wear trajectory 60 is shown in dashed lines.

With reference to FIG. 3, in the axially central portion P1 of the tread 14, the interface trajectory 58 has a length l located radially below the tread pattern blocks 42, the length l being equal to the sum of the lengths l1, l2, l3 located radially below the tread pattern blocks 42, the rest of the length of the interface trajectory 58 being equal to the sum of the lengths U1 and U2 located radially below the cuts 40, in this case radially below the circumferential grooves 44. In this particular instance, in half of the axially central portion P1 of the tread 14, the interface trajectory has a length equal to the sum of the lengths l1, l2, l3, U1, U2 and equal to 8.13 cm with l1=2.90 cm, l2=2.28 cm, l3=l2/2=1.14 cm, U1=0.65 cm and U2=1.16 cm.

In half of the axially central portion P1 of the tread 14, at least 75%, preferably at least 80%, and even more preferentially 90%, of the length l of the interface trajectory 58 located radially below the tread pattern blocks 42, in this case at least 75%, preferably at least 80%, and even more preferentially 90%, of the length l, is arranged radially on the inside of the regulation wear trajectory 60 in the meridian section plane of FIG. 3. In this particular instance, the entirety of the lengths l1, l2, l3 located radially below the tread pattern blocks 42 is located radially on the inside of the regulation wear trajectory 60 such that 100% of the length l of the interface trajectory 58 located radially below the tread pattern blocks 42 is arranged radially on the inside of the regulation wear trajectory 60 in the meridian section plane of FIG. 3.

Figure 4:
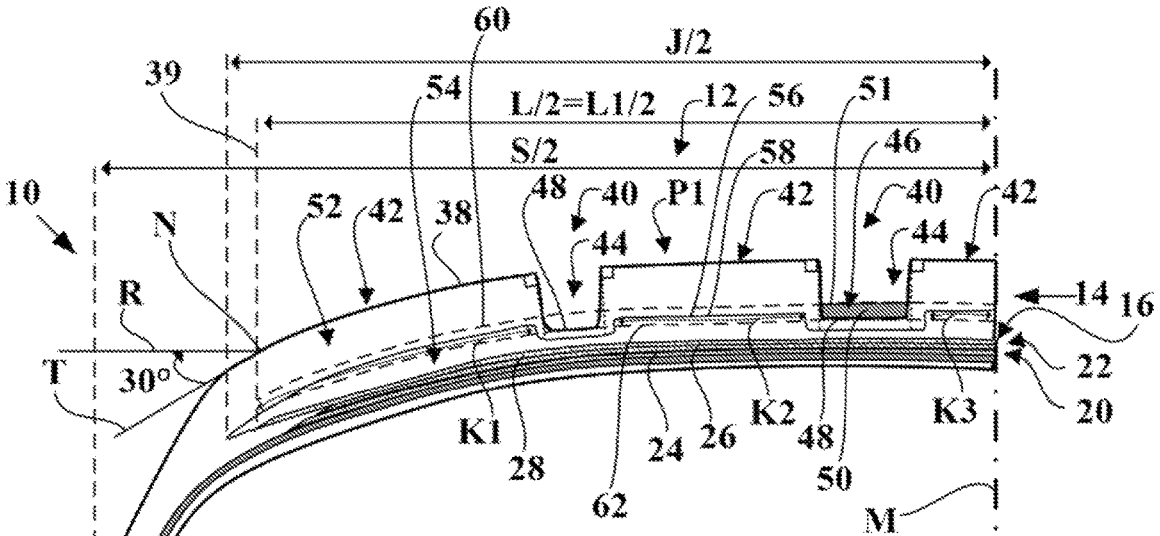

Moreover, in half of the axially central portion P1 of the tread 14, at least 75%, preferably at least 80%, and even more preferentially 90%, of the length of the interface trajectory 58 located radially below the tread pattern blocks 42, in this case at least 75%, preferably at least 80%, and even more preferentially 90%, of the length l, is arranged at a mean radial distance d1 less than or equal to 2.0 mm, preferably less than or equal to 1.2 mm, and more preferentially less than or equal to 1.0 mm, from the regulation wear trajectory 60 in the meridian section plane of FIG. 4. In this particular instance, the lengths K1<l1, K2<l2, K3<l3 correspond to the lengths of the interface trajectory 58 located at a mean radial distance d1 less than or equal to 1.0 mm from the regulation wear trajectory 60. In this case, K1=2.85 cm, K2=2.18 cm and K3=1.09 cm, such that 97% of the length l is arranged at a mean radial distance d1 less than or equal to 1.0 mm from the regulation wear trajectory 60 in the meridian section plane of FIG. 4.

In addition, in half of the axially central portion P1 of the tread 14, at least 75%, preferably at least 80%, and even more preferentially 90%, of the length of the interface trajectory 58 located radially below the tread pattern blocks 42, in this case at least 75%, preferably at least 80%, and even more preferentially 90%, of the length l, is arranged at a mean radial distance d1 greater than or equal to 0.4 mm, preferably greater than or equal to 0.6 mm, from the regulation wear trajectory 60 in the meridian section plane of FIG. 4. In this particular instance, the entirety of the lengths l1, l2, l3 located radially below the tread pattern blocks 42 is arranged at a mean radial distance d1 greater than or equal to 0.6 mm from the regulation wear trajectory 60, such that 100% of the length l is arranged at a mean radial distance d1 greater than or equal to 0.6 mm from the regulation wear trajectory 60 in the meridian section plane of FIG. 4.

In this way, the radial distance between the regulation wear trajectory 60 and the entirety of the length l of the interface trajectory 58 located radially below the tread pattern blocks 42 varies between 0.8 mm and 2.65 mm. If limited to the lengths K1, K2, K3 located radially below the tread pattern blocks 42, 97% of the length l of the interface trajectory 58 located radially below the tread pattern blocks 42 is arranged at a radial distance of between 0.6 mm and 1.0 mm of the regulation wear trajectory 60 corresponding to a mean radial distance d1 equal to 0.85 mm in the meridian section plane of FIG. 4.

Figure 5:
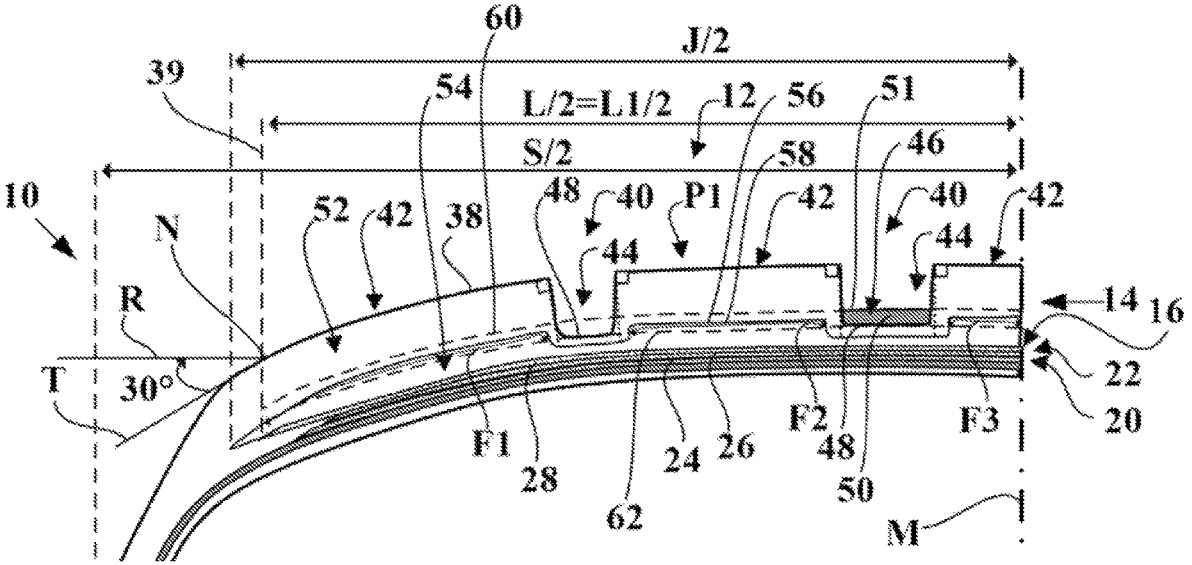

In addition, in half of the axially central portion P1 of the tread 14, at least 75%, preferably at least 80%, and even more preferentially 90%, of the length of the interface trajectory 58 located radially below the tread pattern blocks 42, in this case at least 75%, preferably at least 80%, and even more preferentially 90%, of the length l, is arranged radially on the outside of a trajectory 62 which is parallel to the tread surface 38 of the tyre 10 when new and passes through the radially innermost point of the deepest cut, in this case passes through the bottom 48 of each circumferential groove 44, in the meridian section plane of FIG. 5. In this particular case, the lengths F1, F2, F3, which are such that K1<F1<l1, K2<F2<l2, K3<F3<l3, correspond to the lengths of the interface trajectory 58 arranged radially on the outside of the trajectory 62. In this case, F1=2.86 cm, F2=2.20 cm and F3=1.10 cm, such that 97% of the length l of the interface trajectory 58 located radially below the tread pattern blocks 42 is arranged in half of the axially central portion P1 of the tread 14, radially on the outside of the trajectory 62, in the meridian section plane of FIG. 5.

With reference to FIG. 6, in half of the axially central portion P1 of the tread 14, the axial portion of the tread 14 located radially below the deepest cut, in this case located radially below each circumferential groove 44, comprises a non-zero radial thickness E1 of the tread layer 52 and a non-zero radial thickness E2 of the backing layer 54. The ratio E1/E2 varies between 0.40 and 0.60 and in this case is substantially equal to 0.50.

Still with reference to FIG. 6, in half of the axially central portion P1 of the tread 14, the mean distance d2 between the layer comprising the radially outermost reinforcing elements of the crown reinforcement 16, in this case the hooping layer 28 and the radially innermost point of the deepest cut, in this instance the bottom 48 of each circumferential groove 44, is less than or equal to 2.50 mm, preferably less than or equal to 2.25 mm, and greater than or equal to 1.0 mm. In this particular instance, d2=2.10 mm.

It should be noted that, since the tyre is symmetrical with respect to the median plane M, the calculations illustrated in FIGS. 1 and 3 to 6 representing half of the meridian section of the tyre 10 and half of the axially central portion P1 likewise hold true for an entire meridian section of the tyre 10 and the entire axially central portion P1.

The tread layer 52 comprises an elastomeric tread material M1 and the backing layer 54 comprises an elastomeric backing material M2 that is different from the elastomeric tread material. In this particular instance, the elastomeric tread material is based on the composition CD1 described in WO2018115722, while the elastomeric backing material is based on the composition CC1 described in WO2018115722. Other compositions can of course be used by varying the contents of the various constituents of the compositions in order to obtain properties suitable for particular uses, without however departing from the scope of the invention.

The volume of elastomeric tread material M1 in the central part P1 is greater than or equal to 60%, preferably greater than or equal to 65%, and in this case is equal to 70% of the volume of the central part P1. The volume of elastomeric backing material M2 in the central part P1 is less than or equal to 40%, preferably less than or equal to 35%, of the volume of the central part P1, and in this instance is equal to 30%.

The elastomeric tread material M1 exhibits a complex dynamic shear modulus $G^*\_1$, measured at 10% strain in accordance with the standard ASTM D-5992-96, at a temperature of 23° C. and a frequency of 10 Hz, ranging from 1.30 MPa to 4.10 MPa, and preferably ranging from 1.30 MPa to 3.00 MPa, and in the present case $G^*\_1=2.13$ MPa.

The elastomeric backing material M2 exhibits a complex dynamic shear modulus $G^*\_2$, measured at 10% strain in accordance with the standard ASTM D-5992-96, at a temperature of 23° C. and a frequency of 10 Hz, of greater than or equal to 2 MPa, preferably ranging from 2.00 MPa to 4.10 MPa and more preferentially ranging from 2.15 MPa to 3.50 MPa, and in the present case $G^*\_2=2.14$ MPa.

It should be noted that $G^*\_2 \geq 0.90 \times G^*\_1$ and even that $G^*\_2 \geq 0.92 \times G^*\_1$, and even $G^*\_2 \geq G^*\_1$, and in the present case $G^*\_2 > G^*\_1$.

The elastomeric tread material M1 exhibits a dynamic loss $tanD0\_1$, measured in accordance with the standard ASTM D-5992-96, at a temperature of 0° C. and a frequency of 10 Hz, ranging from 0.50 to 1.00, and more preferentially ranging from 0.50 to 0.85, and in the present case $tanD0\_1=0.67$.

The elastomeric backing material M2 exhibits a dynamic loss $tanD0\_2$, measured in accordance with the standard ASTM D-5992-96, at a temperature of 0° C. and a frequency of 10 Hz, ranging from 0.60 to 1.10, and more preferentially ranging from 0.60 to 1.00, and in the present case $tanD0\_2=0.65$.

It should be noted that $tanD0\_2 \geq 0.37 \times tanD0\_1$, and even that $tanD0\_2 \geq 0.5\ tanD0\_1$, preferably $tanD0\_2 \geq 0.75 \times tanD0\_1$. It should be noted that other very advantageous embodiments in which the elastomeric backing material M2 is modified so as to increase $tanD0\_2$, it is preferably the case that $tanD0\_2 \geq tanD0\_1$ and very advantageously $tanD0\_2 > tanD0\_1$ and even $tanD0\_2 \geq 1.10 \times tanD0\_1$. In order to increase the value of $tanD0\_2$, it would be possible to increase the glass transition temperature of the elastomeric backing material and/or its silica content, as is known to a person skilled in the art.

Among the other properties of the elastomeric materials M1 and M2, it should be noted that the elastomeric tread material M1 exhibits a dynamic loss $tanDMAX23\_1$, measured in accordance with the standard ASTM D-5992-96, at a temperature of 23° C. and a frequency of 10 Hz, ranging from 0.13 to 0.70 and preferably from 0.13 to 0.47, and in the present case equal to 0.25. It should also be noted that the elastomeric backing material M2 exhibits a dynamic loss $tanDMAX23\_2$, measured in accordance with the standard ASTM D-5992-96, at a temperature of 23° C. and a frequency of 10 Hz, ranging from 0.13 to 0.53 and preferably from 0.13 to 0.46, and in the present case equal to 0.31.

Figure 7:
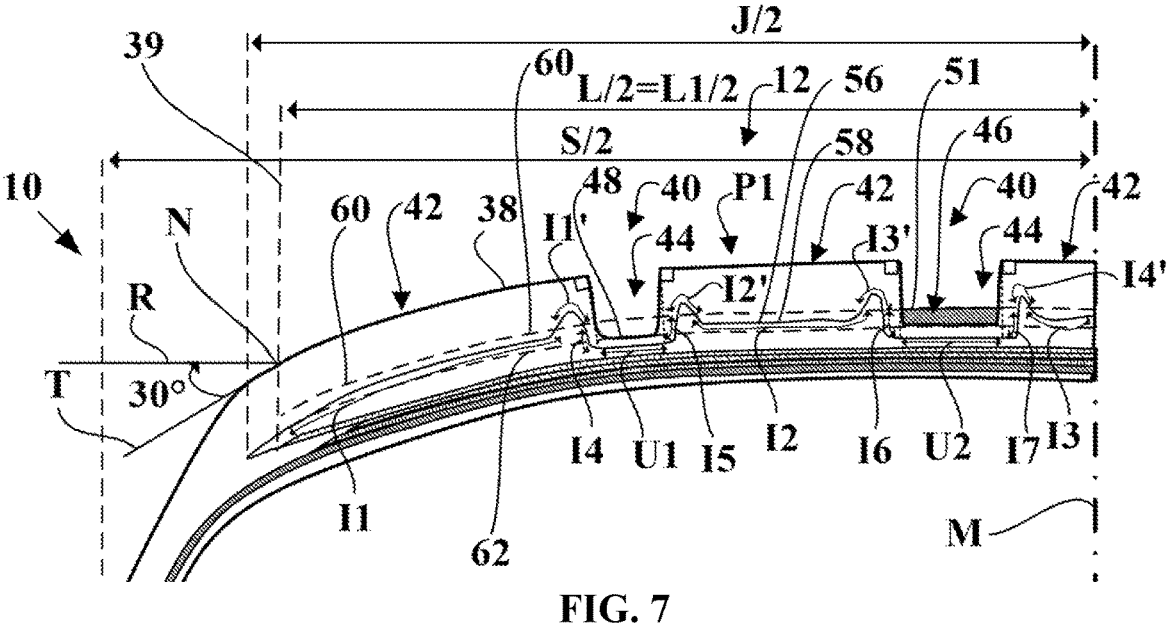

A tyre according to a second embodiment is shown in FIG. 7. Elements similar to those shown in the previous figures are denoted by identical references.

By contrast with the tyre according to the first embodiment, the tyre according to the second embodiment of FIG. 7, in the axially central portion P1 of the tread 14, exhibits instances of rising of the backing layer 54 close to the cuts 40, in this case circumferential grooves 44, vertically below each tread pattern block 42. Thus, in the axially central portion P1 of the tread 14, at least a non-zero length l' of the interface trajectory 58 located radially below the tread pattern blocks 42 is arranged, in the meridian section plane of FIG. 7, radially on the outside of the regulation wear trajectory 60. In this case, l=l1+l2+l3+l4+l5+l6+l7+l', l'=l1'+l2'+l3'+l4' where l1=2.44 cm, l2=1.64 cm, l3=l2/2=0.82 cm, l4=l5=l6=l7=0.25 cm, l1'=l2'=l3'=l4'=0.35 cm. At most 25% of the total length l of the interface trajectory 58 located radially below the tread pattern blocks 42 is arranged radially on the outside of the regulation wear trajectory 60, and in this case l'/l=1.40/5.9=23%, in the meridian section plane of FIG. 7.

Figure 8:
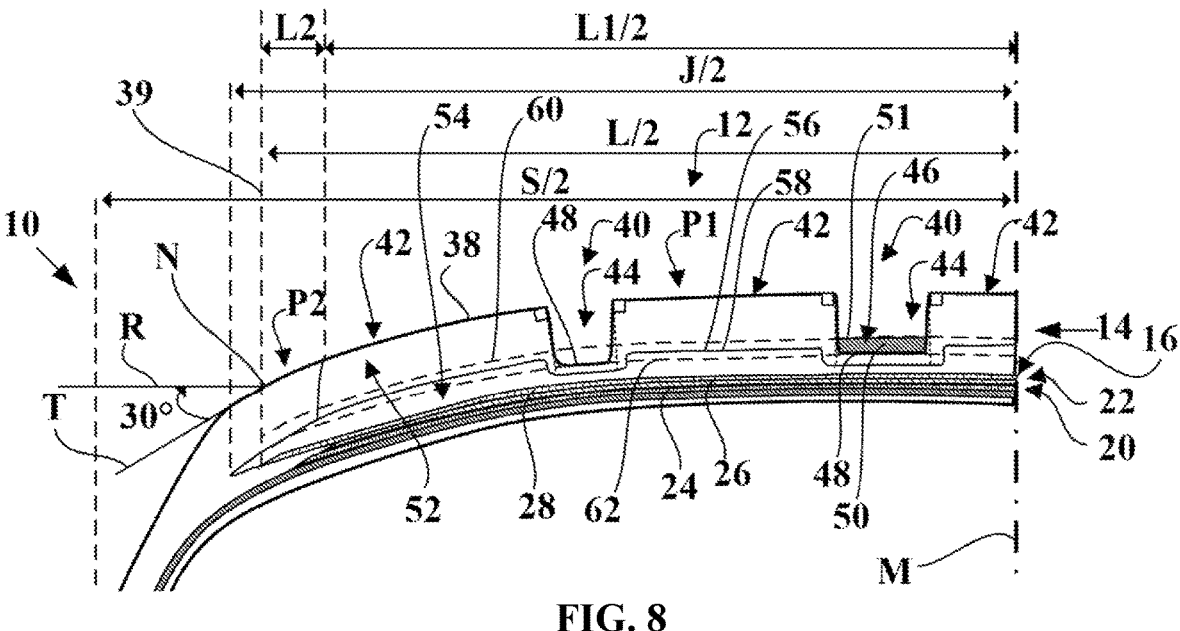

A tyre according to a third embodiment is shown in FIG. 8. Elements similar to those shown in the previous figures are denoted by identical references.

By contrast with the previous embodiments, the axially central portion P1 of the tread 14 has an axial length L1 strictly less than the axial width L of the tread surface 38 such that the tread 14 comprises axially lateral portions P2 arranged axially on the outside of the axially central portion P1. Each axially lateral portion P2 has an axial width L2 at most equal to 15% of the axial width L of the tread, and in this instance L2/(L1+L2)=4%. In the embodiment of FIG. 8, the tread layer 52 of each axially lateral portion P2 comprises an elastomeric material different from the elastomeric material of the axially central portion P1. For example, an elastomeric material exhibiting a relatively low rolling resistance will be selected, for example as described in WO2014/090845.

COMPARATIVE TESTS

The tyre 10 according to the first embodiment was compared with a MICHELIN Primacy 4 tyre of the prior art having the same dimensions in a test for grip on wet ground once half of the wear potential of the tyre has been exceeded. For comparison purposes, the elastomeric tread material of the MICHELIN Primacy 4 tyre of the prior art is identical to the elastomeric material M1 of the tyre 10 according to the first embodiment. The elastomeric backing material of the MICHELIN Primacy 4 tyre of the prior art exhibits:

a complex dynamic shear modulus $G^*\_2T$, measured at 10% strain in accordance with the standard ASTM D-5992-96, at a temperature of 23° C., equal to 1.90 MPa, and a dynamic loss $tanD0\_2T$, measured in accordance with the standard ASTM D-5992-96, at a temperature of 0° C. and a frequency of 10 Hz, equal to 0.23.

First of all, each tyre was planed down until a tread pattern height equal to 2 mm was reached in order to simulate a degree of use of more than half, and in this case 93%, of its wear potential. The tread pattern height is defined as the radial height between the radially innermost point of the or each deepest cut and its projection onto the ground when the tyre is running. This tread pattern height is such that the regulation wear trajectory is not reached, the latter corresponding to a tread pattern height which is equal to 1.6 mm and being representative of an advanced state of wear of the tyre, in this particular instance over half of its wear potential (in this case, 93% of the wear potential has been used up). The planing down was performed in a manner known to a person skilled in the art on a rolling machine equipped with a planing head, in contact with which the tyre is made to run under running conditions representative of normal running conditions.

At the end of this planing-down step, under identical conditions and on one and the same vehicle, four planed-down MICHELIN Primacy 4 tyres and four planed-down tyres 10 according to the invention were tested in order to determine the mean deceleration of a vehicle fitted with these tyres between 80 km/h and 20 km/h. This test was carried out using the recommendations of the standard ISO 23671-2006 and in a way that made it possible to determine a coefficient of braking force BFCT for the MICHELIN Primacy 4 tyre of the prior art and a coefficient of braking force BFCA for the tyre 10 according to the invention. The greater the coefficient of braking force, the better is the performance of the tyre that was tested. The results of the test are such that BFCA/BFCT=106, thereby demonstrating an improved braking performance on wet ground of the tyre according to the invention over the tyre of the prior art.

The invention is not limited to the embodiments described above.

The invention claimed is:

1. A tire for a passenger vehicle, the tire comprising a tread comprising cuts and tread pattern blocks, the cuts separating the tread pattern blocks from one another, the tread being intended to come into contact with a ground when the tire is running via a tread surface, the tread comprising at least one regulation wear indicator defining a regulation wear threshold, and, in an axially central portion of the tread having an axial width equal to at least 70% of a width of the tread surface, the tread comprises:

a tread layer bearing the tread surface, the tread layer comprising an elastomeric tread material exhibiting:
a complex dynamic shear modulus $G*\_1$, measured at 10% strain in accordance with standard ASTM D-5992-96, at a temperature of 23° C. and a frequency of 10 Hz, and
a dynamic loss $tanD0\_1$, measured in accordance with standard ASTM D-5992-96, at a temperature of 0° C. and a frequency of 10 Hz;

a backing layer for the tread layer arranged radially on an inside of the tread layer, the backing layer comprising an elastomeric backing material exhibiting:
a complex dynamic shear modulus $G*\_2$, measured at 10% strain in accordance with standard ASTM D-5992-96, at a temperature of 23° C. and a frequency of 10 Hz, and
a dynamic loss $tanD0\_2$, measured in accordance with standard ASTM D-5992-96, at a temperature of 0° C. and a frequency of 10 Hz, wherein the elastomeric tread material is different from the elastomeric backing material such that the tread layer and the backing layer are contiguous via an interface describing an undulating interface trajectory having a radially highest portion and a radially lowest portion, being in a meridian section plane, wherein $tanD0\_2 > 0.37 \times tanD0\_1$ and $G*\_2 \geq 0.90 \times G*\_1$, wherein, in the axially central portion of the tread, by defining, in the meridian section plane, a regulation wear trajectory that is parallel to the tread surface of the tire when new and passes through a radially outermost point of the regulation wear indicator, at least 75% of a length of the undulating interface trajectory located radially below the tread pattern blocks is arranged, in the meridian section plane, radially on an inside of the regulation wear trajectory, wherein, in the axially central portion of the tread, at least 75% of the length of the undulating interface trajectory located radially below the tread pattern blocks is arranged, in the meridian section plane, at a mean radial distance less than or equal to 2.0 mm from the regulation wear trajectory, and wherein the regulation wear indicator is formed by a protuberance extending radially from a bottom of a circumferential groove radially outwards, both a radially innermost face of the regulation wear indicator and a radially outermost face of the regulation wear indicator being both radially outside the radially lowest portion of the undulating interface trajectory and radially inside the radially highest portion of the undulating interface trajectory.

2. A tire for a passenger vehicle, the tire comprising a tread comprising cuts and tread pattern blocks, the cuts separating the tread pattern blocks from one another, the tread being intended to come into contact with a ground when the tire is running via a tread surface, the tread comprising at least one regulation wear indicator defining a regulation wear threshold, and, in an axially central portion of the tread having an axial width equal to at least 70% of a width of the tread surface, the tread comprises:

a tread layer bearing the tread surface, the tread layer comprising an elastomeric tread material exhibiting:
a complex dynamic shear modulus $G*\_1$, measured at 10% strain in accordance with standard ASTM D-5992-96, at a temperature of 23° C. and a frequency of 10 Hz, and
a dynamic loss $tanD0\_1$, measured in accordance with standard ASTM D-5992-96, at a temperature of 0° C. and a frequency of 10 Hz;

a backing layer for the tread layer arranged radially on an inside of the tread layer, the backing layer comprising an elastomeric backing material exhibiting:
a complex dynamic shear modulus $G*\_2$, measured at 10% strain in accordance with standard ASTM D-5992-96, at a temperature of 23° C. and a frequency of 10 Hz, and
a dynamic loss $tanD0\_2$, measured in accordance with standard ASTM D-5992-96, at a temperature of 0° C. and a frequency of 10 Hz, wherein the elastomeric tread material is different from the elastomeric backing material such that the tread layer and the backing layer are contiguous via an interface describing an undulating interface trajectory having a radially highest portion and a radially lowest portion, being in a meridian section plane, wherein $tanD0\_2 \geq 0.37 \times tanD0\_1$ and $G*\_2 \geq 0.90 \times G*\_1$, wherein, in the axially central portion of the tread, by defining, in the meridian section plane, a regulation wear trajectory that is parallel to the tread surface of the tire when new and passes through a radially outermost point of the regulation wear indicator, at least 75% of a length of the undulating interface trajectory located radially below the tread pattern blocks is arranged, in the meridian section plane, radially on an inside of the regulation wear trajectory, wherein, in the axially central portion of the tread, at least 75% of the length of the undulating interface trajectory located radially below the tread pattern blocks is arranged, in the meridian section plane, at a mean radial distance less than or equal to 2.0 mm from the regulation wear trajectory, wherein, in the axially central portion of the tread, at least a non-zero length of the undulating interface trajectory located radially below the tread pattern blocks is arranged, in the meridian section plane, radially on an outside of the regulation wear trajectory, and wherein the regulation wear indicator is formed by a protuberance extending radially from a bottom of a circumferential groove radially outwards, a radially innermost face of the regulation wear indicator being both radially outside the radially lowest portion of the undulating interface trajectory and radially inside the radially highest portion of the undulating interface trajectory, and a radially outermost face of the regulation wear indicator being both radially inside the radially highest portion of the undulating interface trajectory and radially outside the radially lowest portion of the undulating interface trajectory.

3. The tire according to claim 2, wherein $tanD0\_2 \geq 0.5 \times tanD0\_1$.

4. The tire according to claim 2, wherein $G*\_2 \geq 0.92 \times G*\_1$.

5. The tire according to claim 2, wherein, in the axially central portion of the tread, at least 75% of the length of the undulating interface trajectory located radially below the tread pattern blocks is arranged, in the meridian section plane, radially on an outside of a trajectory which is parallel to the tread surface of the tire when new and passes through a radially innermost point of a or each deepest cut.

6. The tire according to claim 2, wherein, in the axially central portion of the tread, at least 75% of the length of the undulating interface trajectory located radially below the tread pattern blocks is arranged, in the meridian section plane, at a mean radial distance greater than or equal to 0.4 mm from the regulation wear trajectory.

7. The tire according to claim 2, wherein $tanD0\_1$ ranges from 0.50 to 1.00.

8. The tire according to claim 2, wherein $tanD0\_2$ ranges from 0.60 to 1.10.

9. The tire according to claim 2, wherein $G*\_1$ ranges from 1.30 MPa to 4.10 MPa.

10. The tire according to claim 2, wherein $G*\_2$ is greater than or equal to 2.00 MPa.

11. The tire according to claim 2, further comprising a crown comprising a crown reinforcement arranged radially on an inside of the tread, wherein, in the axially central portion of the tread, a mean distance between a layer comprising radially outermost reinforcing elements of the crown reinforcement and a radially innermost point of a or each deepest cut is less than or equal to 2.50 mm.

12. The tire according to claim 2, further comprising a crown comprising a crown reinforcement arranged radially on an inside of the tread, wherein, in the axially central portion of the tread, a mean distance between a layer comprising radially outermost reinforcing elements of the crown reinforcement and a radially innermost point of a or each deepest cut is greater than or equal to 1.0 mm.

13. The tire according to claim 2, wherein the elastomeric tread material exhibits a dynamic loss $tanDMAX23\_1$, measured in accordance with standard ASTM D-5992-96, at a temperature of 23° C. and a frequency of 10 Hz, ranging from 0.13 to 0.70.

14. The tire according to claim 2, wherein the elastomeric backing material exhibits a dynamic loss $tanDMAX23\_2$, measured in accordance with standard ASTM D-5992-96, at a temperature of 23° C. and a frequency of 10 Hz, ranging from 0.13 to 0.53.

15. The tire according to claim 2, wherein a surface-area void ratio of the tire exhibiting a tread pattern height equal to 2.0 mm after wear ranges from 20% to 35%.

* * * * *